H. FRANCIS.
CUTTING OR BORING TOOL OR BORING HEAD.
APPLICATION FILED MAR. 30, 1920.

1,434,995.

Patented Nov. 7, 1922.

INVENTOR
HENRY FRANCIS

Patented Nov. 7, 1922.

1,434,995

UNITED STATES PATENT OFFICE.

HENRY FRANCIS, OF SHEPHERD'S BUSH, ENGLAND.

CUTTING OR BORING TOOL OR BORING HEAD.

Application filed March 30, 1920. Serial No. 369,981.

*To all whom it may concern:*

Be it known that I, HENRY FRANCIS, a subject of the King of Great Britain and Ireland, and a resident of Shepherd's Bush, county of Middlesex, England, have invented a certain new and useful Improvement in Cutting or Boring Tools or Boring Heads, of which the following is a specification.

This invention relates to cutting or boring tools or boring heads of the kind adapted to bore holes to a predetermined diameter, and which comprise a boring head suitably slotted to carry the tool holders, and at the back of which head a plate is carried which can be revolved and has cut on its face a screw thread or scroll which engages with a corresponding thread cut on the back of the tool holders, and by revolving which scroll plate the diameter of the boring head is enlarged or decreased, means being provided for holding the scroll plate in position and for locking the tool holders when set to the required diameter.

The present invention consists in the construction, combination and arrangement of parts, particularly as regards the effecting of the rotation of the scroll plate and the locking of the cutting blades, in adjusted position, hereinafter described, shown and claimed.

In carrying the aforesaid invention into effect, a number of cutting tools or blades (hereinafter called blades) are secured in substantially square, rectangular, or circular blocks (hereinafter called blocks) which blocks are free to move in one or more holes or slots, provided in a cylindrical body (hereinafter called the body) the said slots or holes radiating from the axis of the body to its periphery, each block is provided on one of its faces with a helical V-shaped thread which engages with a like V-shaped helical thread on a scroll provided in one face of a ring (hereinafter called the ring) which accurately fits the reduced diameter of the body. The ring is forced against the grooved face of the block or blocks by means of a screwed ring (hereinafter called the nut) which is provided with a screw thread on its internal diameter, and engages in a like screw thread provided on the reduced diameter of the body. The nut when screwed against the plain face of the ring forces the grooved face of the ring against the grooved face of the block, thus locking them securely in any desired position.

In order that the invention may be clearly understood and readily carried into effect, I will describe the same more fully with reference to the accompanying drawings, in which:—

Figures 1, 2:
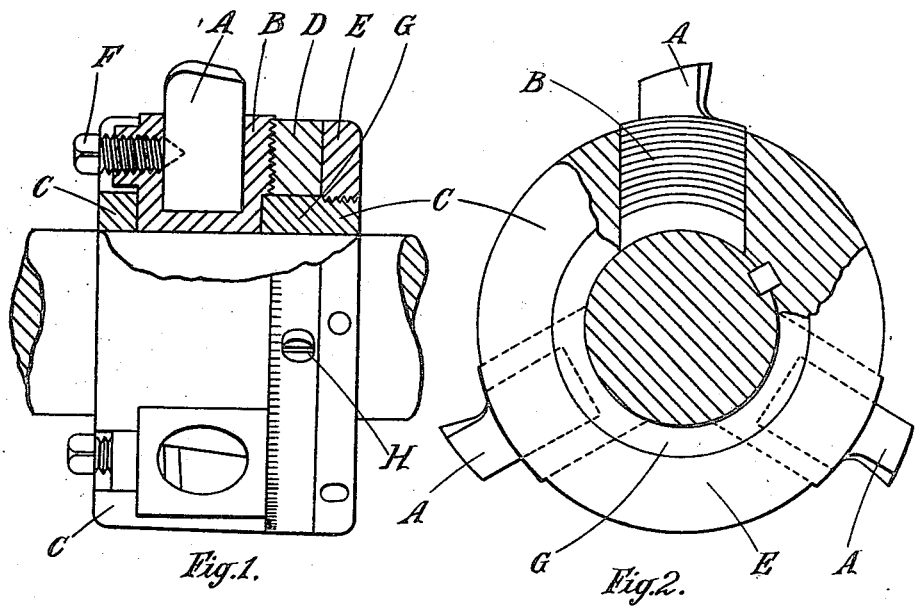

Figure 1 is a side elevation, partly in section; and,

Figure 2 a sectional rear elevation of the boring tool embodied in this invention and illustrates the type of tool in which a hole passes through the centre of the body in order that the boring head may be used on a bar in boring holes which pass completely through the article to be bored.

Figures 3, 4:
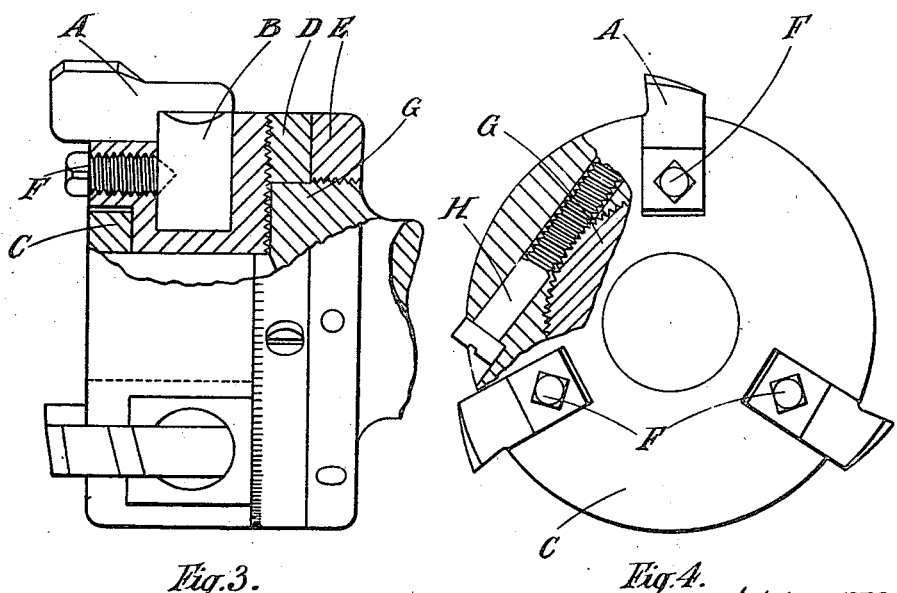

Figure 3 is a side elevation, partly in section; and

Figure 4 a front elevation, partly in section, of the boring tool as applied to boring holes in which the hole does not pass completely through the article to be bored, but is closed at one end.

The adjustment of the blades A to and from the axis of the body C is obtained by revolving the ring D in the direction required to increase or decrease the distance between the axis of said body C and the cutting edges of the blades A. The grooved face of the blocks B being engaged and fitting into the grooved face of the ring D causes the blocks B to move inwards or outwards from the axis of the body in ratio to the amount of the movement given to the ring D. When the desired adjustment has been obtained, the nut E is rotated on the threads T to be screwed firmly against the plain face of the ring, thus locking the blocks in position.

Any convenient or known means for securing the blades A within the blocks B may be made use of, such as screws engaging in screwed holes passing through one side of the block and into the holes or slots C' provided in the blocks to receive the blades, and to facilitate the adjustment of the blades, the ring D may be provided with graduated lines on its periphery, see Figures 1 and 3.

The means, in accordance with the present invention, for revolving the ring upon the body, consist of a screw H passing transversely through the ring, and engaging tangentially with helical grooves or rack teeth R formed in and around the reduced circumference or neck G of the body C, see particularly Figure 4.

The blades A may be circular, square or rectangular sectionally and the portion projecting from the blocks B may be extended in a line with the axis of the body C until they project beyond either face of the body. The extended portion of the blades being supported against the pressure of the cut by a slot S, in which slot the extended portion of the blades are accurately fitted.

The body C may be provided with a hole through its centre, thus forming a true cylindrical body, or may be solid and be provided with a shank formed integrally with the body and on the same axis; or the shank may be screwed into the body.

I claim:—

A boring tool of the class described including a circular head, screw threads formed on said head adjacent one end thereof, rack teeth formed on the head adjacent the threads, a plurality of tool-carrying blocks having feeding teeth on one face thereof, an adjusting ring having teeth on one side thereof for engaging with the feeding teeth on the tool blocks, and said ring surrounding the portion of the body having the rack teeth thereon, a feed screw carried by the adjusting ring for engaging with said rack teeth, and a locking ring adapted to engage with said screw threads to lock the adjusting ring in a set position.

In testimony whereof I have affixed my signature hereto this 1st day of March, 1920.

HENRY FRANCIS.